United States Patent [19]

Zarola

[11] Patent Number: 5,335,618
[45] Date of Patent: Aug. 9, 1994

[54] COLLAPSIBLE ANIMAL ENCLOSURE

[75] Inventor: J. Anthony Zarola, Alpine, Calif.

[73] Assignee: Stopgap Enterprises, Alpine, Calif.

[21] Appl. No.: 96,508

[22] Filed: Jul. 22, 1993

[51] Int. Cl.$^5$ .............................................. A01K 23/00
[52] U.S. Cl. ................................................................ 119/19
[58] Field of Search ...................... 119/19, 15, 20, 17, 119/165, 168, 167, 166; 220/666, 85 B

[56] References Cited

U.S. PATENT DOCUMENTS

| 1,303,736 | 5/1919 | Speicher | 119/19 |
| 1,345,968 | 7/1920 | Speicher | 119/19 |
| 1,449,428 | 3/1923 | McGaffee | 119/19 |
| 3,324,831 | 6/1967 | Onge | 119/19 |
| 4,711,198 | 12/1987 | Mossbarger | 119/165 |
| 4,776,300 | 10/1988 | Braddock | 119/165 |
| 4,825,892 | 5/1989 | Norman | 135/104 |
| 5,054,426 | 10/1991 | Panarelli et al. | 119/17 |
| 5,065,702 | 11/1991 | Hasiuk | 119/165 |

FOREIGN PATENT DOCUMENTS

| 195794 | 4/1923 | United Kingdom . |
| 225405 | 12/1924 | United Kingdom . |
| 347330 | 4/1931 | United Kingdom . |
| 369225 | 3/1932 | United Kingdom . |

Primary Examiner—Thomas Price
Attorney, Agent, or Firm—Brown, Martin, Haller & McClain

[57] ABSTRACT

A collapsible animal enclosure has a house unit with spaced side walls and a roof of pliable material, and opposite ends forming an enclosed area for housing an animal. Support bows extend transversely across the side walls and roof for holding the side walls and roof in an open, spread apart condition. The house unit can be collapsed between a fully erect condition in which the opposite ends are spread a maximum distance apart and a collapsed condition in which the ends are pushed inwardly towards one another, collapsing the pliable material between the ends in an accordion-folded manner. An extended run unit of similar construction to the house unit is releasably securable to one end of the house unit to provide an extended exercise area.

19 Claims, 2 Drawing Sheets

COLLAPSIBLE ANIMAL ENCLOSURE

BACKGROUND OF THE INVENTION

The present invention relates generally to animal enclosures or houses and is particularly concerned with a collapsible house for a pet which can be collapsed into a compact condition for storage or carrying when not in use.

Various types of pet houses and enclosures have been proposed in the past for providing a sleeping area for a pet and for confining a pet when necessary, for example when travelling. These have generally been relatively bulky, and are often unwieldy and heavy to move around. U.S. Pat. No. 5,054,426 of Panarelli et al., for example, describes a cage-like, box-shaped housing for pets in which two end shell housings telescope on a central cage section to modify the amount of internal space available to a pet. U.S. Pat. No. 3,324,831 of Onge describes a foldable pet house in which the components are pivotally connected together to move between the erected and collapsed position. This is of a relatively complex nature.

SUMMARY OF THE INVENTION

It is an object of the present invention to provide a new and improved collapsible animal enclosure.

According to the present invention, an animal enclosure is provided which comprises a housing unit of pliable material having spaced side walls and a roof forming an enclosed area for receiving an animal, first and second end walls at opposite ends of the housing unit, and at least two spaced support bows secured to the housing for holding the housing material in an erect, transversely expanded condition, each support bow having a shape corresponding to the transverse cross-sectional shape of the housing and extending transversely across the first side wall, roof and second side wall, the housing being collapsible in an accordion-like fashion between an erect condition in which the end walls are spaced apart by a distance equal to the maximum length of the housing and a collapsed condition in which the end walls and support bows are collapsed axially towards one another into a flattened condition, with the material between the support bows collapsing in an accordion-folded manner. The end walls are preferably of fabric.

Preferably, longitudinal spreader bars are releasably mountable lengthwise along the housing to hold the end walls apart. Suitable pockets may be provided in the side walls and roof for receiving the spreader bars, which preferably comprise spring loaded, telescopic tension bars. The spreader bars act against the end walls at opposite ends of the housing to hold the enclosure in its erect position. A floor or lower wall may be provided for releasably securing to the lower end of the housing, via suitable releasable fasteners such as Velcro ® strips or the like, although the housing unit may alternatively have a floor of the same material as the side walls and roof, or may be simply placed flat on the ground. The housing unit may optionally be tied down by stakes or the like in a similar manner to a tent. In order to collapse the housing, the floor is first removed, allowing the spreader bars to be taken out. The end walls are then simply forced inwardly towards one another, with the pliable material of the housing collapsing in an accordion-like fashion between the support bows into a collapsed condition for easy carrying or storage.

In a preferred embodiment of the invention, the side walls and roof are formed from one continuous piece of material such as canvas or the like, and the roof is of arched shape. The end walls are preferably of flexible material such as canvas, so that the unit is washable when the tensioning bars are removed. However, they may be of rigid construction in alternative arrangements. The floor may be of semi-rigid foam type material. The support bows form arched ribs at spaced intervals and are suitably secured on the inside or outside of the housing, for example by extending the ribs or bows through pockets on the inside of the material. A carrying case or bag may be provided for carrying the collapsed enclosure. The bag will have a shape matching that of the collapsed enclosure.

The end walls are preferably of rigid material such as fiberglass and may be covered with a material matching that of the remainder of the housing. One or more windows may be provided in the sides of the housing. At least one of the end walls has an opening for entry into and exit from the housing. A door may be provided for confining the animal in the housing as necessary, with a zipper closure.

Preferably, an extension or run unit is provided for releasably securing to one end of the housing unit to provide an extended, confined area for an animal, allowing the animal to exercise while keeping it safely confined. The housing extension or run unit is of similar construction to the housing, but is longer. The housing extension unit has spaced side walls and a roof of pliable material such as fabric or plastic mesh, and a series of spaced support bows or ribs secured transversely across the side walls and roof to hold the material transversely erect. One end of the extension unit is open and is releasably securable to one end of the housing unit, and a closed end wall is secured to the opposite end of the extension unit. The side walls and roof are preferably formed from a single piece of mesh material. The housing extension can be collapsed in a similar manner to the housing, simply by urging opposite ends of the extension inwardly towards one another, collapsing the material between adjacent support bows in an accordion-like fashion as far as possible until the extension is fully collapsed.

Preferably the outer carrying case is designed to carry and store both the collapsed housing unit and extension unit. The collapsible animal housing and extension units are particularly useful when travelling, as they are storable in a substantially flattened, compact condition while not in use, and can be erected quickly and easily for the pet as needed, for example at a camping site or the like.

BRIEF DESCRIPTION OF THE DRAWINGS

The present invention will be better understood from the following detailed description of a preferred embodiment of the invention, taken in conjunction with the accompanying drawings, in which like reference numerals refer to like parts, and in which.

DESCRIPTION OF THE PREFERRED EMBODIMENT

Figure 1:
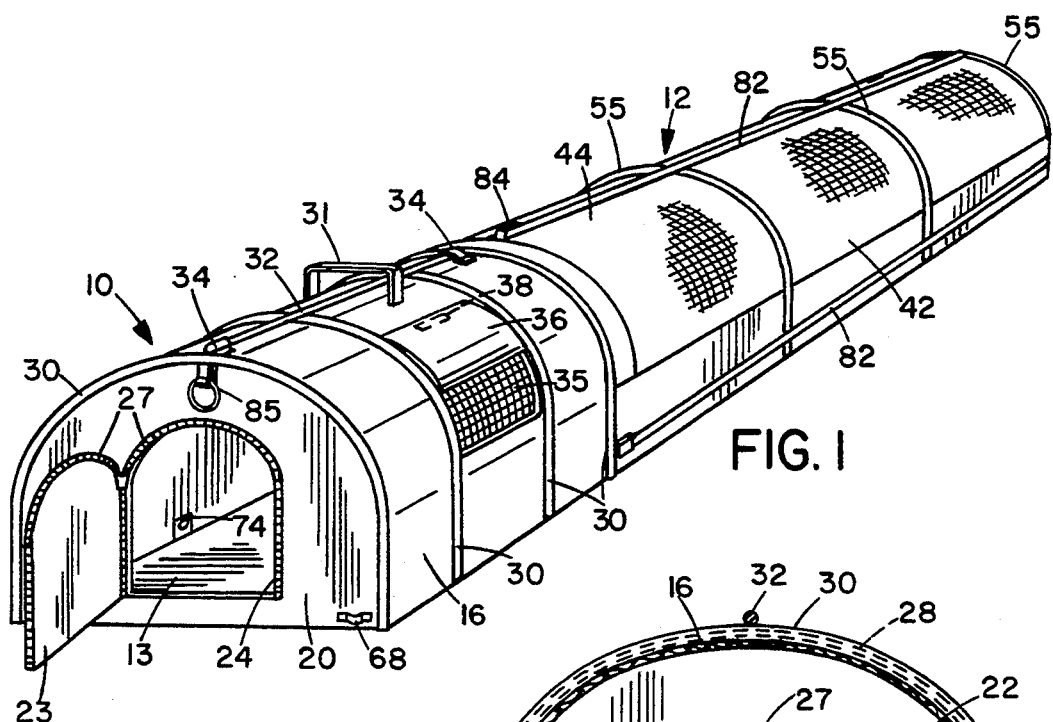
FIG. 1 is a perspective view of the animal house and run according to a preferred embodiment of the invention in erected position.

A collapsible animal house unit 10 and extension or run unit 12 forming an animal enclosure according to a preferred embodiment of the present invention are illustrated in the drawings. The house unit may be used alone as an animal's sleeping quarters, or may be attached to the run unit as illustrated in FIG. 1 to provide a confined exercise area for an animal.

Figure 3:
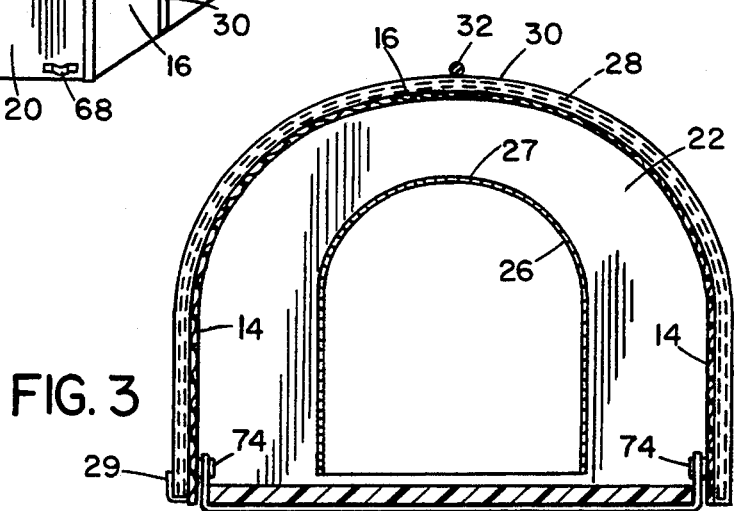
FIG. 3 is a sectional view taken on line 3—3 of FIG. 2.
Figure 2:
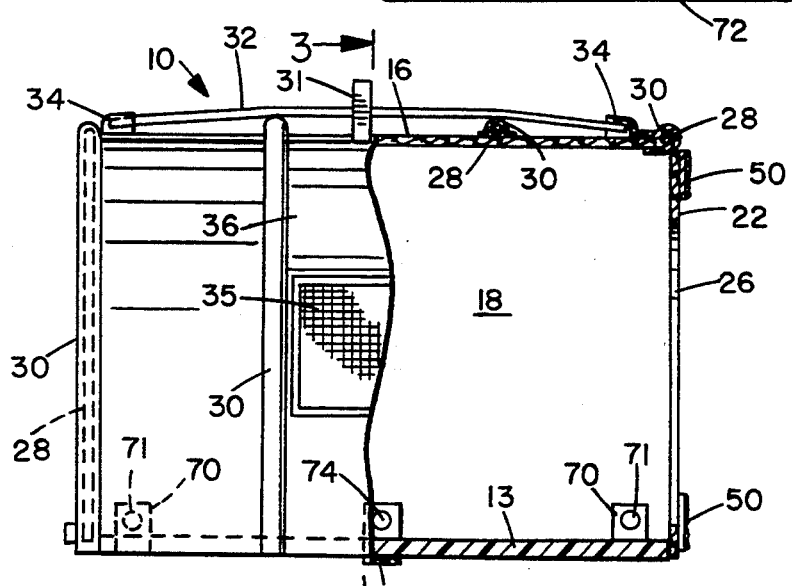
FIG. 2 is an enlarged side elevation view, partially cut away, of the doghouse portion.

The animal house unit 10 is best illustrated in FIGS. 1-3 and comprises a flat floor 13, spaced side walls 14 and roof 16 forming an enclosed area 18. End walls 20,22 are secured at opposite ends of the enclosure 10. Each end wall 20,22 has an opening 24,26, respectively, for allowing entry to, and exit from, the enclosure. Optionally, a door 23 may be provided for closing one or both end wall openings 24,26, as indicated in FIG. 1. The end walls are preferably of canvas material with the or each door 23 being secured in place via zipper fastener 27.

The side walls and roof are preferably formed in one piece of a suitable pliable material such as canvas or the like. The floor 13 may be formed of the same material, but is of rigid or semi-rigid material such as fiberglass or plastic foam material in the illustrated embodiment. The floor 13 is releasably secured in the unit via snap fastener tabs 70 at the four corners of the floor which engage corresponding snap fasteners 71 at the corners of the side walls. Additionally, one or more straps 72 extend beneath the floor and are secured to the side walls at the midsection of the unit, via suitable fasteners 74 such as snaps or the like. This provides a secure connection to allow the house to be carried with a lightweight animal inside. Alternatively, a sewn-in floor of canvas or the like may be used.

The end walls are preferably of pliable material such as canvas, as noted above, but may be of rigid material. The roof is preferably of arched shape as illustrated in FIGS. 1 and 3, although it may be flat in alternative embodiments. Four arched support bows or ribs 28, which may be of spring steel, aluminum or the like, are secured transversely across the side walls and roof of the enclosure at spaced intervals, with two located adjacent the opposite end walls and two between the end walls. The support bows act to hold the material in a transversely stretched, erect configuration, as best illustrated in FIG. 3. The ribs 28 extend through suitable pockets or channels 30 provided around the side walls and roof for that purpose, as illustrated in FIG. 2. One end of each channel 30 is closed while the opposite end is closable via a closure flap 29 secured to the channel via strips of Velcro ® or the like. Ribs 28 are not needed if the end walls are rigid. A carrying handle 31 may be provided on the roof region of the house unit, as illustrated in FIG. 1.

A longitudinal spreader bar 32 is releasably installed in a single pocket running along the top of the housing or two end pockets 34 at opposite ends of the housing, as illustrated in FIGS. 1-3, in order to hold the housing erect with the end walls spaced as far as possible apart. The spreader bar 32 preferably comprises a tension rod having two telescoping parts which are spring loaded apart. It is held under tension via end pockets 34 or, where a single continuous sleeve or pocket is used, via an end closure flap at one end of the pocket, which may be secured in place via Velcro ® or the like. Additional spreader bars may be provided along each side of the housing if necessary.

The house 10 preferably has one or more windows 35 which are formed by cutting out a three-sided flap 36 of the material forming a side wall to leave an opening or window 35. The window may be covered by mesh material or the like, as illustrated in FIG. 1. The flap 36 may be secured out of the way as illustrated in FIG. 1 by a suitable fastener 38 such as Velcro ® strips, and may be released to cover the window as desired. The arched support bows 28 may be provided on each side of the window, as indicated in FIG. 1.

When the house unit 10 is erect as in FIGS. 2 and 3, it forms a convenient enclosure for a pet to sleep in. End wall 22 may be a solid wall instead of having an opening 26 as illustrated in FIG. 3, if desired. The house unit may be used alone, or may alternatively be attached to the extension or run unit 12 in order to provide an extended, confined area for a pet to sleep, eat and exercise.

Figure 4:
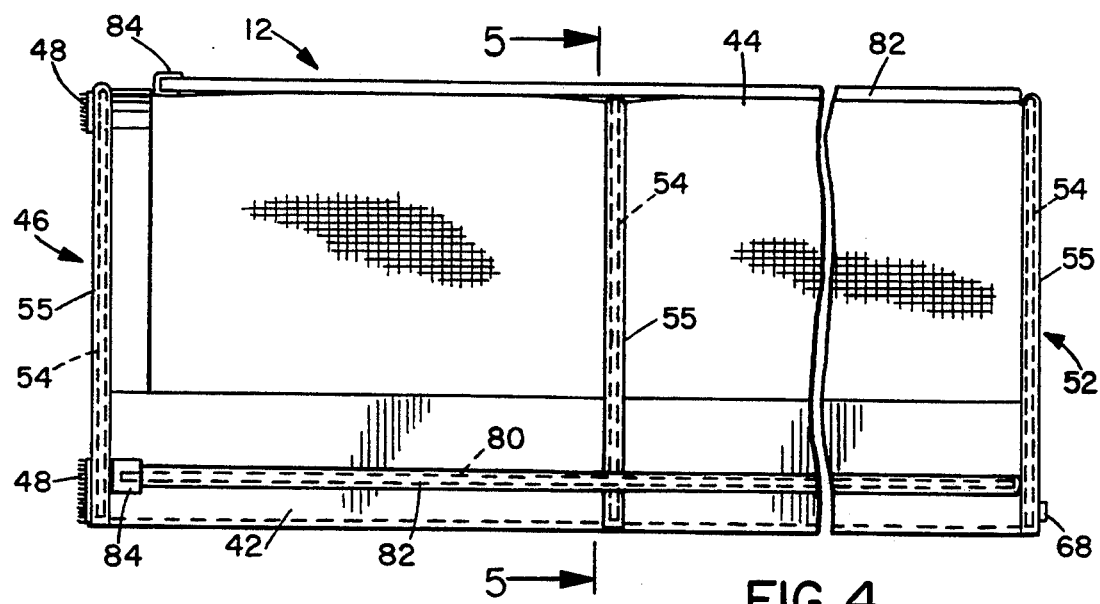
FIG. 4 is an enlarged side elevation view of the run portion.
Figure 5:
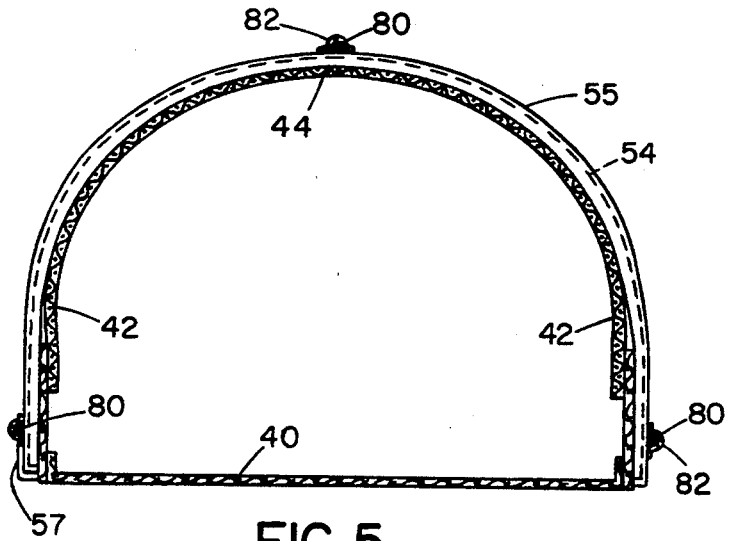
FIG. 5 is a sectional view taken on line 5—5 of FIG. 4.

The run unit 12 is illustrated in more detail in FIGS. 4 and 5. The unit is of a similar shape and configuration to the house unit 10, but is longer. Unit 12 has a floor 40, upstanding side walls 42, and arched roof 44. It is open at one end 46 which has suitable attachment means such as Velcro ® strips 48 for releasable attachment to corresponding, mating Velcro ® strips 50 on the house unit. A closed end wall 52 is provided at the opposite end of the unit.

The side walls and roof of the unit 12 are preferably formed in one piece of a pliable mesh material, such as a fabric or plastic mesh. The floor 40 is of pliable material such as canvas. Spaced support bows or ribs 54, similar to the support bows 28 of the house unit, are secured at spaced intervals transversely across the side walls and roof of the unit. Support bows are provided at spaced intervals along the run unit. One or more additional support bows are provided along the run depending on the length of the run. Preferably, support bows are provided at 16-inch intervals. The bows may be inserted in suitable pockets or sleeves 55 provided on the outside of the unit, as best illustrated in FIG. 5, with closure flaps 57 at one end of each sleeve, as in the house unit. The support bows support the side walls and roof in their fully erect, spread apart condition, as best illustrated in FIG. 5. A support bow 54 is also provided in the outer end wall 52 of the housing, and extends through a pocket 55 as indicated.

Longitudinal spreader bars or tension rods 80, which are similar to the spreader bar 32 in the house unit, are releasably installed to run along the length of the housing and hold the ends 46, 52 apart. Three spreader bars 80 are provided at spaced intervals around the periphery of the run, with one running along the top and two running along opposite sides of the run, as best illustrated in FIG. 5. Each bar 80 is inserted in a pocket 82 provided on the outside of the run and closable by means of an end flap 84 at one end closed with Velcro ® to hold the bar 80 under tension, as best illustrated in FIG. 4.

Figure 6:
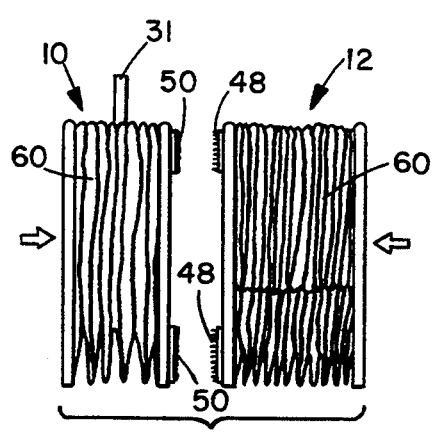
FIG. 6 is a side elevation view of the doghouse and run collapsed for storage.
Figure 7:
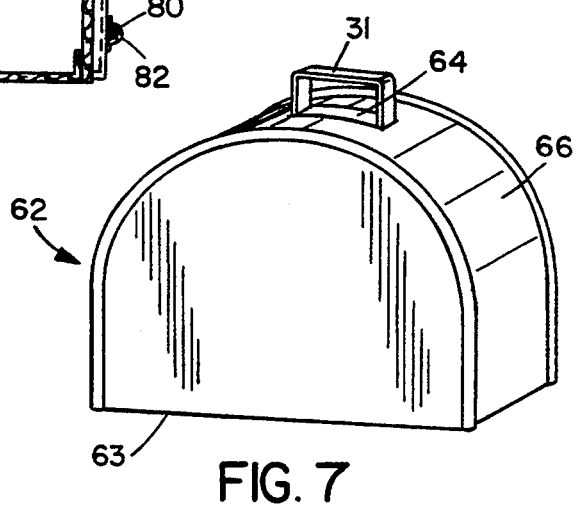
FIG. 7 illustrates a typical carrying bag for the collapsed components.

Both the house unit and the run unit can be collapsed in an accordion-like fashion for storage and transportation when not in use. In order to collapse the two units, the longitudinal spreader bars 32 and 80 are first removed, along with the floor of the house unit. The opposite ends of each unit can then be urged towards one another so that the pliable material between the support ribs collapses in an accordion-folded or pleated fashion to form folds 60, as illustrated in FIG. 6. The foam floor may also be folded in two for storage. A carrying case or bag 62 is preferably provided for carrying the collapsed units and folded floor, as illustrated in FIG. 7. The bag 62 has an arched shape corresponding to that of the collapsed house and run units, and is open at its base 63. The bag 62 has an opening 64 on the upper part of arcuate wall 66 through which the handle 31 on the house unit can be extended when the collapsed house unit is inserted into the bag through the open base 63.

The house and run units may have suitable tabs or grommets 68 for receiving lines for tethering the units to tent stakes or the like, to hold the erect house unit or house and run units securely in a desired location. The house unit may have a ring or grommet 85 on a flap secured to end wall 20 for a pet to be secured via a leash, for example, when the door is open.

Although both the house and run unit in the illustrated embodiment have a floor, the run unit or both units may alternatively be open at the bottom and tethered directly to a suitable ground surface.

The units may be of any suitable dimensions depending on the size of the animal. In one example, the run was four feet in length.

Both the house unit and run unit are very lightweight and easy both to transport and erect. They can be collapsed into a compact configuration quickly and easily when not in use, making them easy to store and transport. The assembly will be particularly useful when travelling with pets, since it will take up little space while travelling and can be easily erected on arrival at a destination such as a camp site. Thus, pets can be provided with secure sleeping and living quarters as necessary.

Although a preferred embodiment of the invention has been described above by way of example only, it will be understood by those skilled in the field that modifications may be made to the disclosed embodiment without departing from the scope of the invention, which is defined by the appended claims.

I claim:

1. An animal enclosure, comprising:
    a house unit having spaced side walls, a roof, and opposite ends forming an enclosed area for housing an animal;
    at least one end of the house unit having an entry opening for allowing an animal to enter and exit the enclosed area;
    at least the side walls and roof of the housing being made of a pliable material;
    at least two support bows extending transversely across the side walls and roof of the housing, each support bow comprising a resilient member of shape corresponding to the cross-sectional shape of the house unit and comprising means for holding the side walls and roof of the house unit in an open, erect condition;
    a releasable, longitudinal spreader bar extending between the opposite ends of the house unit to hold the opposite end walls apart in an erect condition; and
    the house unit being collapsible between an erect, fully extended condition in which the opposite ends are spaced apart by a maximum distance and a collapsed condition in which the ends are urged towards one another to collapse the material between the ends in an accordion-folded manner, the spreader bar being removable from the house unit to allow the house unit to be collapsed axially inwardly into its collapsed condition.

2. The enclosure as claimed in claim 1, wherein the spreader bar comprises a compressible tension bar, and the house unit having a pocket for releasably receiving the spreader bar.

3. The enclosure as claimed in claim 1, wherein the side walls and roof are formed from one continuous piece of material.

4. The enclosure as claimed in claim 3, wherein the roof is arched.

5. The enclosure as claimed in claim 3, including a flat floor secured across the lower end of the house unit.

6. The enclosure as claimed in claim 1, including opposite end walls of rigid material secured to the opposite ends of the housing.

7. The enclosure as claimed in claim 6, wherein at least one end wall has an opening for allowing an animal to exit and enter the house unit.

8. The enclosure as claimed in claim 7, wherein both end walls have an opening.

9. An animal enclosure, comprising:
    a house unit having spaced side walls, a roof, and opposite ends forming an enclosed area for housing an animal;
    at least one end of the house unit having an entry opening for allowing an animal to enter and exit the enclosed area;
    at least the side walls and roof of the housing being made of pliable material;
    at least two support bows extending transversely across the side walls and roof of the housing, each support bow comprising a resilient member of shape corresponding to the cross-sectional shape of the house unit and comprising means for holding the side walls and roof of the house unit in an open, erect condition;
    the house unit being collapsible between an erect, fully extended condition in which the opposite ends are spaced apart by a maximum distance and a collapsed condition in which the ends are urged towards one another to collapse the material between the ends in an accordion-folded manner; and
    a run unit for releasable connection to the house unit, the run unit being of cross-sectional shape corresponding to that of the house unit, and having spaced side walls and roof, a first end which is at least partially open, and a second closed end wall, and forming an extended area for confining an animal, the first end of the run unit and one end of the house unit having interengageable securing means for releasably securing the run unit to the house unit.

10. The enclosure as claimed in claim 9, wherein the side walls and roof of the run unit are of pliable mesh material, and the run unit has transverse support bows extending across the side walls and roof at spaced intervals along the run unit for holding the pliable material in a transversely stretched apart, open condition, the run unit being collapsible between a fully extended, erect condition in which the opposite ends are spaced a maximum distance apart and a collapsed condition in which the opposite ends of the unit are urged inwardly towards one another to compress the pliable material between the ends in an accordion-folded fashion.

11. The enclosure as claimed in claim 10, including at least one longitudinal spreader bar, the run having a pocket extending along the length of the run for releasably receiving the spreader bar.

12. An animal enclosure assembly, comprising:
a house unit for housing an animal;
a run unit releasably securable to the house unit for providing an extended exercise area for an animal;
the house and run units having matching cross-sectional shape and dimensions and each having spaced side walls and a roof, the side walls and roof being of pliable material, and support means for holding the side walls and roof in a spread apart, open condition;
the house and run units each having at least one end wall at one end and an opposite end releasably securable to the corresponding end of the other unit, the end wall of the house unit having an opening for allowing an animal to enter and exit the unit; and
the units each being collapsible between a fully extended, erect condition in which the opposite ends are spread apart by a maximum possible distance, and a collapsed condition in which the opposite ends are urged inwardly towards one another to collapse the material between the opposite ends in an accordion-folded manner.

13. The assembly as claimed in claim 12, wherein said support means include at least one collapsible, spring-loaded tension rod, and releasable mounting means on the house unit for releasably receiving the tension rod so that the tension rod runs longitudinally along the length of the house unit, the tension rod comprising means for holding the opposite ends of the unit spread apart in the fully erect condition.

14. The assembly as claimed in claim 12, wherein said support means includes at least one support bow in each of the units, each support bow extending transversely across the side walls and roof of the respective unit.

15. The assembly as claimed in claim 12, wherein the side walls and roof of each unit are each formed from a single piece of material.

16. The assembly as claimed in claim 15, wherein the side walls and roof of the run unit are formed of pliable mesh material.

17. The assembly as claimed in claim 12, including a carrying case for holding the house and run units in their fully collapsed condition, the carrying case having a shape matching that of the collapsed house and run units.

18. The assembly as claimed in claim 12, wherein each unit has a floor secured across the lower end of the unit.

19. An animal enclosure, comprising:
a house unit having spaced side walls, a roof, and opposite end walls forming an enclosure for housing an animal;
at least one end wall having an opening for allowing an animal to enter and exit the enclosed area;
at least the side walls and roof of the unit comprising a plurality of accordion-like folds;
at least one releasable longitudinal support bar extending across said accordion-like folds for holding the opposite end walls of the unit apart and the accordion-like folds in an erect, fully extended condition;
transverse support means for holding the side walls and roof in an open, erect condition; and
the house unit being collapsible between said erect, fully extended condition in which the opposite ends are spaced apart by a maximum distance and a collapsed condition in which the ends are urged towards one another to collapse the material between the ends in an accordion-folded manner.

* * * * *